(12) United States Patent
Mohta et al.

(10) Patent No.: US 10,050,987 B1
(45) Date of Patent: Aug. 14, 2018

(54) REAL-TIME ANOMALY DETECTION IN A NETWORK USING STATE TRANSITIONS

(71) Applicant: Symantec Corporation, Mountain View, CA (US)

(72) Inventors: Varun Mohta, Mountain View, CA (US); Zhipeng Zhao, Sunnyvale, CA (US); Michael Sylvester Pukish, Santa Clara, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 15/471,836

(22) Filed: Mar. 28, 2017

(51) Int. Cl.
  *H04L 29/06* (2006.01)
  *H04L 12/24* (2006.01)
  *H04L 12/26* (2006.01)
  *H04L 29/08* (2006.01)

(52) U.S. Cl.
  CPC ........ *H04L 63/1425* (2013.01); *H04L 41/064* (2013.01); *H04L 43/16* (2013.01); *H04L 63/1441* (2013.01); *H04L 67/12* (2013.01)

(58) Field of Classification Search
  CPC ... H04L 63/1425; H04L 41/064; H04L 43/16; H04L 63/1441; H04L 67/12
  See application file for complete search history.

(56) References Cited

U.S. PATENT DOCUMENTS 9,485,271 B1 * 11/2016 Roundy .............. H04L 63/1441
9,699,204 B2 * 7/2017 Kim .................... H04L 63/1425
2006/0034305 A1 * 2/2006 Heimerdinger ......... H04L 67/12 370/408
2012/0268256 A1 * 10/2012 Akiyama ................ H04L 67/12 340/425.1
2013/0212668 A1 * 8/2013 Mishina ................... G05B 9/02 726/11
2016/0006753 A1 * 1/2016 McDaid .............. H04L 63/1425 726/23

(Continued)

OTHER PUBLICATIONS

Ippoliti et al., "Online Adaptive Anomaly Detection for Augmented Network Flows", Sep. 2016, ACM Transactions on Autonomous and Adaptive Systems, vol. 11, No. 3, Article 17, pp. 1-28.*

(Continued)

*Primary Examiner* — Matthew Smithers
(74) *Attorney, Agent, or Firm* — Maschoff Brennan

(57) ABSTRACT

Real-time anomaly detection in a network using state transitions. In one embodiment, a method may include identifying a sequence of messages sent between a first network node and a second network node over a network link. The method may further include identifying a sequence of message states for the sequence of messages. The method may also include identifying variable-length candidate patterns in the sequence of message states. The method may further include adding the candidate patterns to a baseline pattern store. The method may also include comparing a real-time sequence of messages to patterns in the baseline pattern store to detect anomalies in the real-time sequence of messages. The method may further include, in response to the detecting of the anomalies, alerting a security action on one or more of the first network node, the second network node, and the network link using the detected anomalies.

17 Claims, 10 Drawing Sheets

(56) References Cited

U.S. PATENT DOCUMENTS

| | | | | |
|---|---|---|---|---|
| 2016/0261482 | A1* | 9/2016 | Mixer | H04L 43/12 |
| 2016/0268256 | A1* | 9/2016 | Yang | H01L 27/088 |
| 2016/0301709 | A1* | 10/2016 | Hassanzadeh | H04L 63/1433 |
| 2016/0330225 | A1* | 11/2016 | Kroyzer | G06F 21/552 |
| 2016/0344754 | A1* | 11/2016 | Rayapeta | H04L 63/1416 |
| 2016/0357177 | A1* | 12/2016 | Chand | G05B 19/4185 |
| 2017/0054751 | A1* | 2/2017 | Schneider | H04L 63/1425 |
| 2017/0149811 | A1* | 5/2017 | Corrales | H04L 63/1425 |

OTHER PUBLICATIONS

Cruz et al., "A Cybersecurity Detection Framework for Supervisory Control and Data Acquisition Systems", Dec. 2016, IEEE Transactions on Industrial Informatics, vol. 12, No. 6, pp. 2236-2246.*

Fontugne et al., "A Hough-transform-based Anomaly Detector with an Adaptive Time Interval", 2011, Applied Computing Review, pp. 1-11.*

C.E. Shannon, "Prediction and Entropy of English", Bell System Technical Journal article, Jan. 1951, 30(1):pp. 50-64.

L.R. Rabiner, "A Tutorial on Hidden Markov Models and Selected Applications in Speech Recognition", IEEE Trans on ASSP, 1984, 32(4):pp. 859-861.

N. Goldenberg and A. Wool, Accurate Modeling of Modbus/TCP for Intrusion Detection in SCADA System, International Journal of Critical Infrastructure Protection, 2013, vol. 6 Issue 2, pp. 63-75.

D. Ron, Y Singer, and N Tishby, "The Power of Amnesia: Learning Probabilistic Automata with Variable Memory Length", ACM Transaction on Computation Theory, 1996, http://www.eng.tau.ac.il/~danar/Public-pdf/psa-ml.pdf.

G. Bejerano and G. Yona, "Variations on Probabilistic Suffix Trees: Statistical Modeling and Prediction of Protein Families", Bioinformatics, 2001, vol. 17, No. 1, pp. 23-43, https://users.soe.ucsc.edu/~jill/papers/bioinfo01.pdf.

U.S. Appl. No. 15/271,494, titled "Systems and Methods for Detecting Obscure Cyclic Application-Layer Message Sequences in Transport-Layer Message Sequences", filed Sep. 21, 2016.

* cited by examiner

REAL-TIME ANOMALY DETECTION IN A NETWORK USING STATE TRANSITIONS

BACKGROUND

Industrial Control Systems (ICSs) are often used to control the functionality of devices and/or machinery that perform manufacturing and/or production operations within an industrial environment. For example, a nuclear power plant may implement and/or rely on an ICS to regulate the production and/or distribution of electrical power. A typical ICS may include a collection of sensors, actuators, controllers, control valves, motors, robotic devices, and/or other computing devices that communicate messages using a specialized network protocol that is designed for ICS environments.

Anomaly detection is a method for detecting suspicious communications within a network. Some anomaly-detection systems will attempt to detect when abnormal (e.g., malicious) message sequences are present on a network. The network traffic in a typical ICS network, also known as an Operational Technology network, may be more cyclic and predictable than the network traffic in a typical Information Technology (IT) network. However, the task of distinguishing between normal message sequences and abnormal message sequences in an ICS network may still be difficult and inaccurate using some anomaly-detection technologies due to the complexity, required memory, required computational power, and slowness of these technologies.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for real-time anomaly detection in a network using state transitions may be performed, at least in part, by a computing device including at least one processor. The method may include identifying a network link between a first network node and a second network node. The method may also include identifying a sequence of messages sent between the first network node and the second network node over the network link, with each message having a message state. The method may further include identifying a sequence of message states for the sequence of messages. The method may also include identifying variable-length candidate patterns in the sequence of message states. The method may further include adding the variable-length candidate patterns and a count of each variable-length candidate pattern to a baseline pattern store. The method may also include comparing a real-time sequence of messages sent between the first network node and the second network node on the network link to the patterns in the baseline pattern store to detect anomalies in the real-time sequence of messages. The method may further include, in response to the detecting of the anomalies, alerting a security action on one or more of the first node, the second node, and the network link using the detected anomalies.

In some embodiments, the method may be performed by a network device that is configured to intercept, or passively listen to, in real-time, sequences of messages sent between the first network node and the second network node on the network link. In some embodiments, the method may be performed by the first network node or by the second network node. In some embodiments, the first network node may include a supervisory station of an industrial control system and the second network node may include an industrial device of the industrial control system. In some embodiments, the messages in the sequence of messages may be formatted in one or more of a MODBUS protocol, a Common Industrial Protocol (CIP) protocol, and a Distributed Network Protocol 3 (DNP3) protocol.

In some embodiments, the act of identifying variable-length candidate patterns in the sequence of message states may further include identifying a threshold confidence score. This act may also include storing the sequence of message states in a sequence data structure. This act may further include identifying unique message states in the sequence of message states and storing the unique message states in a state data structure. This act may also include identifying transitions from each of the unique message states to each of the other unique message states in the sequence of message states and storing the transitions in a transition data structure. This act may further include calculating a count of each of the transitions in the sequence of message states and storing the count for each of the transitions in the transition data structure. This act may also include calculating a confidence score for each of the transitions by dividing the count of the transition by a sum of the counts of all of the transitions from the same unique state. This act may further include initially designating the first message state in the sequence of message states as the beginning message state. This act may also include traversing the transitions in the sequence of message states forward from the beginning message state until the confidence score of a transition is below the threshold confidence score. This act may further include designating the message state following the transition that is below the threshold confidence score as the ending message state. This act may also include designating a candidate pattern from the beginning message state to the ending message state. This act may further include re-designating the ending message state as the beginning message state. This act may also include, while there remains one or more untraversed message states in the sequence of message states, repeating the traversing, the designating, and the re-designating for the one or more untraversed message states in the sequence of message states.

In some embodiments, the method may further include one or more additional iterations. Each iteration may include prepending one or more of the final messages in the sequence of messages to a subsequent sequence of messages sent between the first network node and the second network node over the network link and repeating the identifying of the sequence of message states and the identifying of the variable-length candidate patterns on the subsequent sequence of messages. Each iteration may also include comparing candidate patterns to patterns in the baseline pattern store and splitting any of the patterns where another pattern is a prefix to the pattern. Each iteration may further include adding the candidate patterns to the baseline pattern store and updating the count of each pattern in the baseline pattern store.

In some embodiments, the method may further include performing the security action on one or more of the first node, the second node, and the network link. In some embodiments, the method may further include periodically repeating the acts of the method, other than the comparing of the real-time sequence of messages and the alerting, in parallel with the comparing of the real-time sequence of messages and the alerting.

Further, in some embodiments, one or more non-transitory computer-readable media may include one or more computer-readable instructions that, when executed by one or more processors, cause the one or more processors to perform a method for real-time anomaly detection in a network using state transitions.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
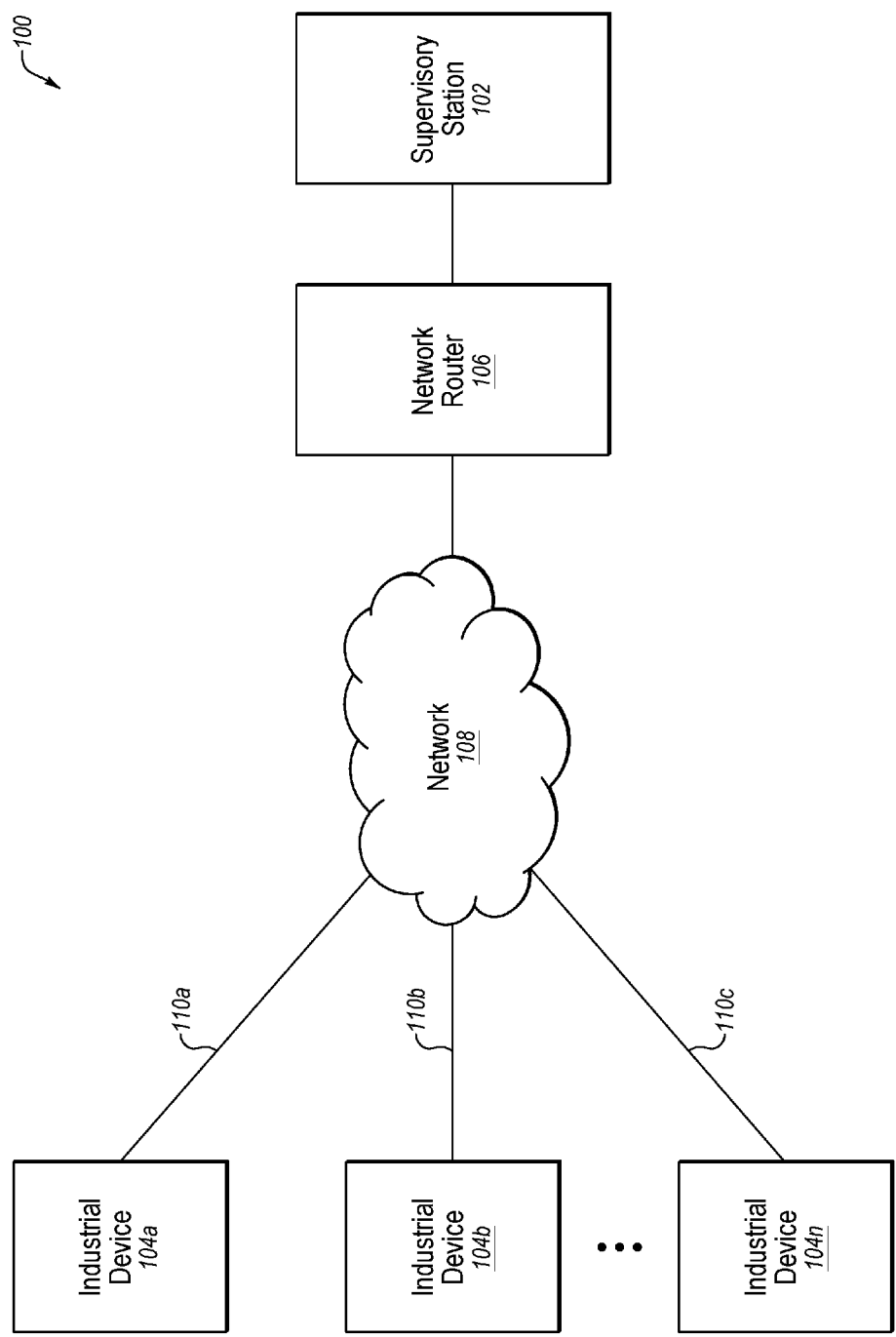
FIG. 1 illustrates an example system configured for real-time anomaly detection in a network using state transitions.

Some embodiments in this disclosure relate to real-time anomaly detection in a network using state transitions.

In an Industrial Control System (ICS) environment, many devices are configured to operate in an autonomous mode and periodically communicate messages with each other. This makes modeling the interactions among devices and system transitions feasible as a way to build a baseline for the system behavior. Anomaly detection is then possible by comparing real-time system behavior with this baseline to detect when abnormal (e.g., malicious) message sequences are present on a network.

However, the modeling of a baseline for different sets of devices may be difficult because patterns in messages may vary widely. For example, some message patterns in message sequences may be relatively longer and other message patterns may be relatively shorter. Therefore, the modeling of baseline patterns for multiple sets of devices may be too slow to detect anomalies in real-time and at line speeds and suffer from inaccuracy, high complexity, high memory requirements, and high computational requirements.

The embodiments disclosed herein may provide various benefits. In particular, the embodiments disclosed herein may, for example, enable real-time anomaly detection in a network using state transitions.

In some embodiments, real-time anomaly detection may first include the creation of a baseline. The creation of the baseline may include identifying a network link between a first network node and a second network node, identifying a sequence of messages sent between the first network node and the second network node over the network link, identifying a sequence of message states for the sequence of messages, identifying variable-length candidate patterns in the sequence of message states, and adding the candidate patterns and a count of each pattern to a baseline pattern store.

In some embodiments, real-time anomaly detection may next include comparing a real-time sequence of messages sent between the first network node and the second network node on the network link to the patterns in the baseline pattern store to detect anomalies in the real-time sequence of messages. Then, in response to the detecting of the anomalies, the real-time anomaly detection may next alert a security action on one or more of the first node, the second node, and the network link using the detected anomalies.

In some embodiments, the patterns in the baseline pattern store may be periodically and iteratively adapted and refined, causing the patterns to self-correct and become more and more accurate over time. Further, this adapting and refining of the baseline pattern store may occur in parallel to the comparing performed to detect anomalies in real-time sequences of messages. Further, each iteration of this adapting and refining may be performed on a fixed number of messages in a sequence of messages, resulting in a linear processing time for each iteration to $O(K)$ bounds, where K is a constant. Also, each iteration of this adapting and refining may be performed after data structures employed during each iteration are flushed, resulting in a constant consumption of memory for each iteration.

The embodiments disclosed herein may be employed to identify variable-length candidate patterns, such as some relatively longer patterns and other relatively shorter patterns. Further, because the embodiments disclosed herein may accomplish anomaly detection with higher accuracy, lower complexity, lower memory requirements, and lower computational requirements than conventional anomaly detection, these embodiments may be employed to detect anomalies in real-time and at line speeds.

Further, although the embodiments disclosed herein are generally discussed in terms of anomaly detection, it is understood that the embodiments disclosed herein may also be employed in classifying encrypted applications, and this may be performed more accurately than statistical classification methods as a result of the adaptive and self-correcting nature of the embodiments disclosed herein. Therefore, employment of the embodiments disclosed herein is not limited to anomaly detection, but may also extend to classification of encrypted applications or other applications.

Turning to the figures, FIG. 1 illustrates an example system 100 configured for real-time anomaly detection in a network using state transitions. The system 100 may be an ICS, such as a Process Control System (PCS), a Distributed Control System (DCS), a Supervisory Control and Data Acquisition (SCADA) System, and a Safety Instrumented System (SIS). The system 100 may include a supervisory station 102, industrial devices 104a, 104b, and 104n, a network router 106, and a network 108.

In some embodiments, the supervisory station 102 may be any computer system capable of functioning as a network node and/or as an ICS asset. In some embodiments, the supervisory station 102 may be configured to facilitate communication sessions between each of the industrial devices 104a-104n and the supervisory station 102. For example, the supervisory station 102 may be configured to control the industrial devices 104a-104n using messages formatted in one or more network protocols. These network protocols may include, for example, a MODBUS protocol, a Common Industrial Protocol (CIP) protocol, and a Distributed Network Protocol 3 (DNP3) protocol.

In some embodiments, the industrial devices 104a-104n may be any computer system capable of functioning as a network node and/or as an ICS asset. Examples of industrial devices include, but are not limited to, sensors, actuators, motor drives, gauges, indicators, and control-system components such as Programmable Logic Controllers (PLCs), Master Terminal Units (MTUs), Remote Terminal Units (RTUs), Intelligent Electronic Devices (IEDs), Human-Machine Interfaces (HMIs), engineering workstations, application servers, data historians, and Input/Output (TO) servers.

In some embodiments, the network router 106 may be any network device configured to intercept, or passively listen to, messages sent between the supervisory station 102 and the industrial devices 104a-104n over the network 108. Further, the network router 106 may be configured to intercept, or passively listen to, messages sent between the industrial devices 104a-104n themselves over the network 108. The network router 106 may further be configured to forward messages and perform other network traffic direction functions on the network 108. Also, the network router 106 may include, or be replaced by, a network switch, a network gateway, a network tap, SPAN/Mirroring ports on a network switch, router, or gateway, or any other network device capable of intercepting, or passively listening to, messages sent over the network 108.

In some embodiments, the network 108 may be configured to communicatively couple the supervisory station 102, the industrial devices 104a-104n, and the network router 106. In some embodiments, the network 108 may be any wired or wireless network, or combination of multiple networks, configured to send and receive communications between systems and devices. In some embodiments, the network 108 may include a Personal Area Network (PAN), Local Area Network (LAN), Metropolitan Area Network (MAN), a Wide Area Network (WAN), or a Storage Area Network (SAN). In some embodiments, the network 108 may also be coupled to, or may include, portions of a telecommunications network, including telephone lines, for sending data in a variety of different communication protocols, such as a cellular network or a Voice over IP (VoIP) network.

In some embodiments, the network 108 may provide network links between network nodes. For example, the network 108 may provide network links 110a, 110b, and 110c between the supervisory station 102 and the industrial devices 104a, 104b, and 104n, respectively. Each of the network links 110a, 110b, and 110c may be defined by a combination of a MAC address, an IP address, and a Port address of each network node on either end of the network link. As sequences of messages are sent along the network links 110a, 110b, and 110c, the network router 106 may intercept, or passively listen to, the sequences of messages in order to perform the real-time anomaly detection disclosed herein. Additionally or alternatively, as the sequences of messages are sent and received at any of the industrial devices 104a-104n or at the supervisory station 102, the real-time anomaly detection disclosed herein may be performed by the device or station. In either event, the real-time anomaly detection disclosed herein may be performed in real-time and at line speeds.

Modifications, additions, or omissions may be made to the system 100 without departing from the scope of the present disclosure. For example, in some embodiments, the network router 106 may be eliminated. Further, in some embodiments, the system 100 may include additional devices similar to the devices illustrated in FIG. 1 that each may be configured similarly to the devices illustrated in FIG. 1.

Figure 2A:
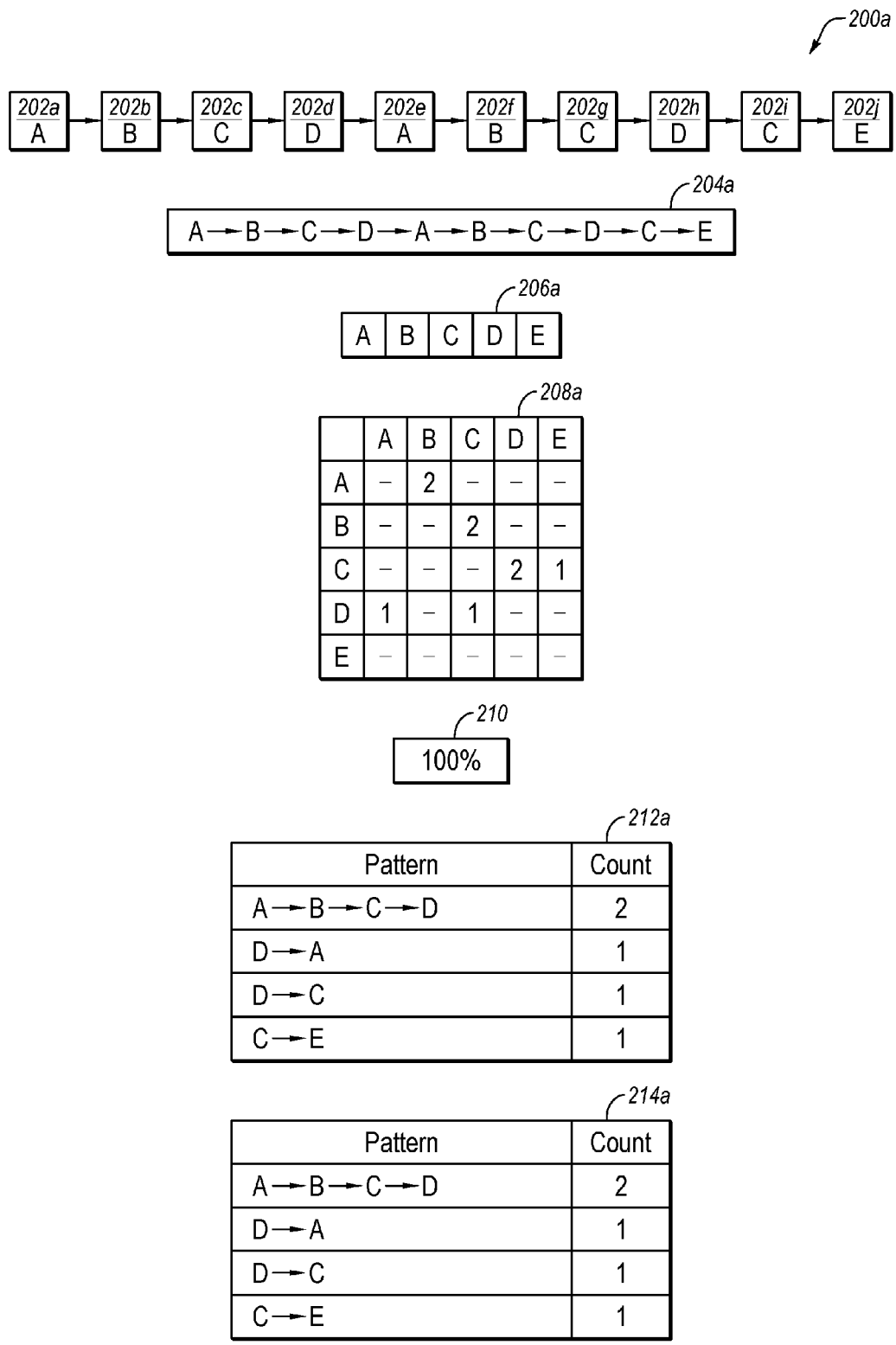
FIGS. 2A-2C is a flowchart of three example iterations of a baseline creation.
Figure 2B:
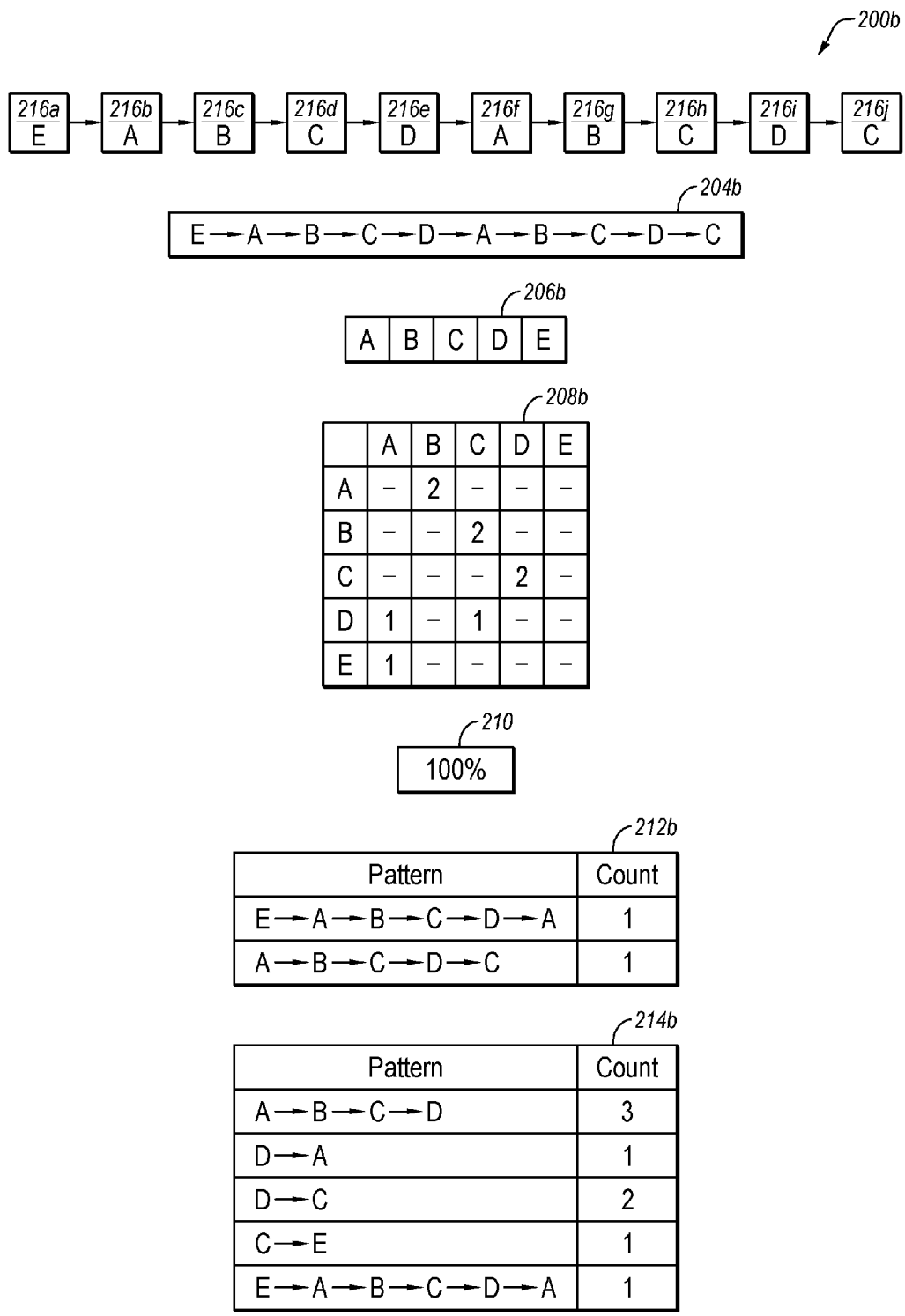
Figure 2C:
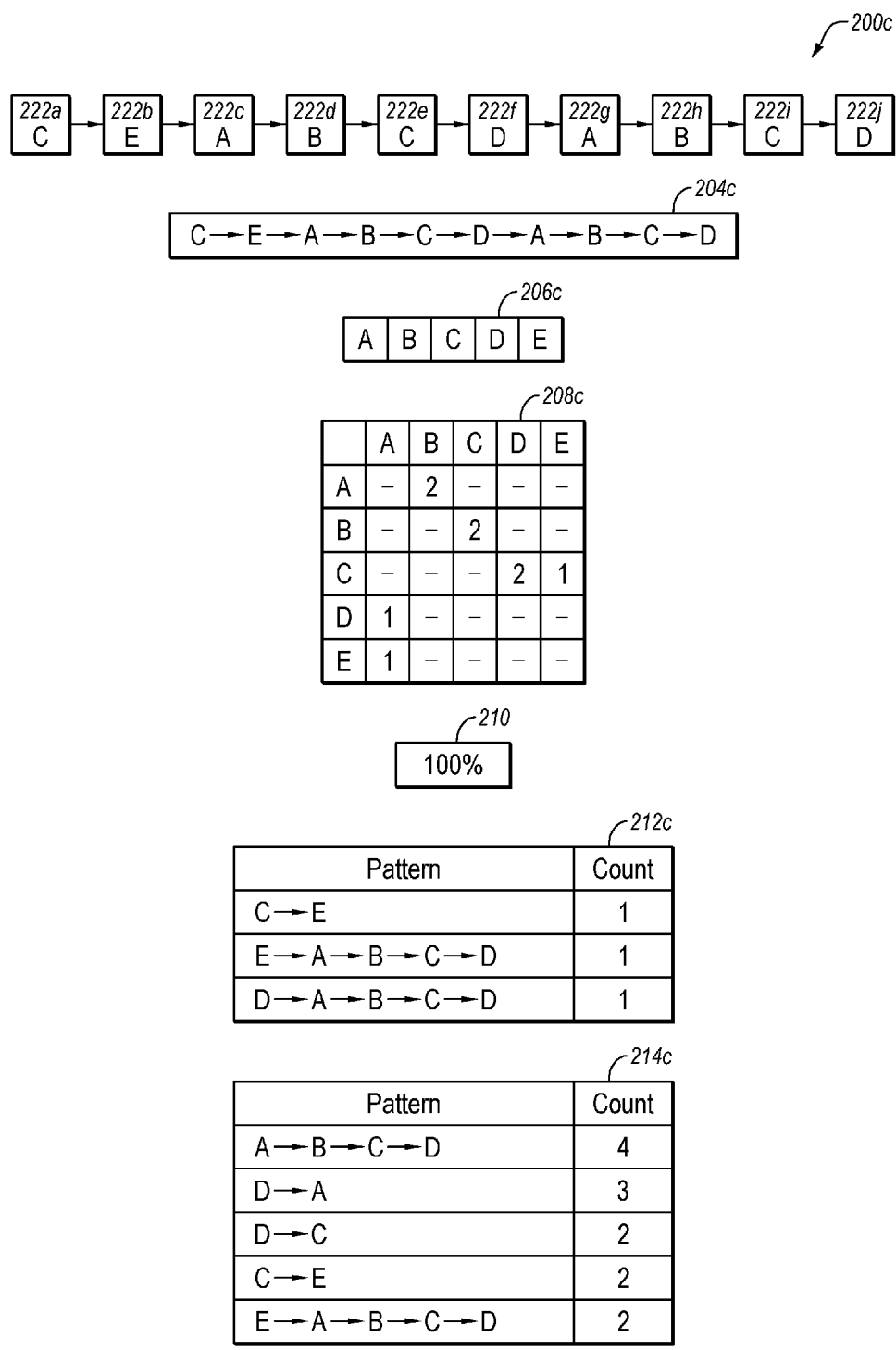

FIGS. 2A-2C is a flowchart of three example iterations 200a, 200b, and 200c of a baseline creation. In particular, FIG. 2A is a first iteration 200a, FIG. 2B is a second iteration 200b, and FIG. 2C is a third iteration 200c of the baseline creation. The baseline creation of FIGS. 2A-2C may be performed to create baseline patterns that can later be compared to a real-time sequence of messages to detect anomalies in the real-time sequence of messages.

The iterations 200a, 200b, and 200c of the baseline creation of FIGS. 2A-2C may be performed by the network router 106, the supervisory station 102, the industrial device 104a, or some combination thereof. Further, the iterations 200a, 200b, and 200c of the baseline creation of FIGS. 2A-2C may be performed after a network link has been identified between a first network node and a second network node, such as the network link 110a between the supervisory station 102 (functioning as a first network node) and the industrial device 104a (functioning as a second network node).

As disclosed in FIG. 2A, the first iteration 200a of the baseline creation may include identifying a sequence of messages 202a-202j sent between the supervisory station 102 and the industrial device 104a over the network link 110a of FIG. 1, with each of the messages 202a-202j having a message state, illustrated as states A, B, C, D, and E. Each of the message states may represent one or more fields in the message corresponding to the network protocol of the message. For example, for a message in a Distributed Network Protocol 3 (DNP3) protocol, a combination of a function code, a group number, and a variation number may be defined as the state of the message.

Next, the first iteration 200a may include identifying a sequence of message states for the sequence of messages 202a-202j, namely ABCDABCDCE. The sequence of message states may then be employed to identify variable-length candidate patterns in the sequence of message states.

In some embodiments, the act of identifying variable-length candidate patterns in the sequence of message states may include identifying a threshold confidence score 210, such as 100%. In some embodiments, a higher threshold confidence score results in shorter candidate patterns while a lower threshold confidence score results in longer candidate patterns. Then, the sequence of message states (i.e., ABCDABCDCE) may be stored in an array 204a or other data structure. Next, unique message states, namely A, B, C, D, and E, in the sequence of message states may be identified and stored in an array 206a or other data structure, and these unique message states may be used to set up a matrix 208a or other data structure. Next, transitions from each of the unique message states to each of the other unique message states stored in the array 204a may be identified and stored in the matrix 208a or other data structure. Next, a count of each of the transitions stored in the array 204a may be calculated and stored in the matrix 208a or other data structure.

For example, as disclosed in the matrix 208a, in the sequence of message states stored in the array 204a, there are two transitions from A to B (with the row of the matrix 208a designating the "from" state and the column of the matrix 208a designating the "to" state), two transitions from B to C, two transitions from C to D, one transition from C to E, one transition from D to A, and one transition from D to C.

Next, a confidence score for each of the transitions may be calculated by dividing the count of the transition by a sum of the counts of all of the transitions from the same unique state. For example, the confidence score for the transition from C to D is 2 (i.e., 2 is the count of the transition C to D stored in the matrix 208a) divided by 3 (i.e., 3 is the sum of the counts of all of the transitions from C stored in the matric 208a), or 67%. In another example, the confidence score for the transition from D to A is 1 (i.e., 1 is the count of the transition D to A stored in the matrix 208a) divided by 2 (i.e., 2 is the sum of the counts of all of the transitions from D stored in the matric 208a), or 50%. Similarly, the confidence score for the transitions from A to B is 100%, from B to C is 100%, from C to E is 33%, and from D to C is 50%.

Next, the first message state (i.e., the first A as stored in the array 204a) in the sequence of message states (i.e., ABCDABCDCE) may be designated as the beginning message state. Then, the transitions in the sequence of message states stored in the array 204a may be traversed forward from the beginning message state (i.e., the first A as stored in the array 204a) until the confidence score of a transition is below the threshold confidence score 210 of 100%. For example, since the confidence score from A to B is 100%, from B to C is 100%, and from C to D is 67%, the first three transitions are traversed. Next, the message state (i.e., the first D as stored in the array 204a) following the transition that is below the threshold confidence score (i.e., the first transition from C to D with the confidence score of 67%) as the ending message state. Then, a candidate pattern from the beginning message state (i.e., the first A as stored in the array 204a) to the ending message state (i.e., the first D as stored in the array 204a) may be designated (i.e., a candidate pattern ABCD may be designated) and stored in a matrix 212a or other data structure, along with the count of the number of times the candidate pattern has appeared.

Next, the ending message state (i.e., the first D as stored in the array 204a) as the beginning message state. Then, since there are still six remaining messages states that have not yet been traversed (i.e., ABCDCE), the traversing, the designating, and the re-designating may be repeated beginning with the beginning message state and traversing through the untraversed message states. This results in candidate patterns DA, ABCD, DC, and CD being identified and stored in the matrix 212a, which concludes the identifying of variable-length candidate patterns in the sequence of message states stored in an array 204a.

Next, the first iteration 200a disclosed in FIG. 2A may conclude with adding the candidate patterns, and the count of each pattern, that are stored in the matrix 212a to a baseline pattern store 214a, which may be a matrix or other data structure. On the first iteration 200a of the baseline creation disclosed in FIG. 2A, since the baseline pattern store 214a was initially empty, this adding results in the baseline pattern store 214a matching the matrix 212a.

As disclosed in FIG. 2B, the second iteration 200b of the baseline creation may include identifying a sequence of messages 216a-216j sent between the supervisory station 102 and the industrial device 104a over the network link 110a of FIG. 1.

In some embodiments, for each iteration after the first iteration, the sequence of messages may include, prepended to the sequence, one or more of the final messages in the previous sequence of messages. This prepending may avoid patterns getting split at the boundary between two sequences of messages, thus enabling transitions at these boundaries to be included in candidate patterns. Therefore, the first message 216a in the sequence of messages 216a-216j in FIG. 2B is actually the last message 202j from the sequence of messages 202a-202j in FIG. 2A.

In some embodiments, each iteration may involve identifying a fixed number of messages for each sequence of messages, resulting in a linear processing time for each iteration. Therefore, in both the first iteration 200a of FIG. 2A and the second iteration 200b of FIG. 2B, the fixed length of each sequence of messages is ten messages. In some embodiments, this fixed number of messages may be referred to as an epoch. The fixed number of ten is an example only, and in some embodiments, an epoch may include a fixed number of messages that is more or less than ten messages.

Next, the second iteration 200b may include identifying a sequence of message states for the sequence of messages 216a-216j, namely EABCDABCDC. The sequence of message states may then be employed to identify variable-length candidate patterns in the sequence of message states.

In some embodiments, the act of identifying variable-length candidate patterns in the sequence of message states may include flushing and reusing the data structures 204a, 206a, 208a, and 212a of FIG. 2A and reusing these data structures as 204b, 206b, 208b, and 212b in FIG. 2B, resulting in a constant consumption of memory for each iteration. Next, the sequence of message states (i.e., EABCDABCDC) may be stored in the array 204b, the unique message states (i.e., A, B, C, D, and E) in the sequence of message states may be identified and stored in the array 206b, and transitions from each of the unique message states to each of the other unique message states stored in the array 204b may be identified and stored in the matrix 208b. Then, a count of each of the transitions stored in the array 204b may be calculated and stored in the matrix 208b.

For example, as disclosed in the matrix 208b, the sequence of message states stored in the array 204b includes two transitions from A to B, two transitions from B to C, two transitions from C to D, one transition from D to A, one transition from D to C, and one transition from E to A.

Next, a confidence score for each of the transitions may be calculated, resulting in a confidence score for the transitions from A to B of 100%, from B to C of 100%, from C to D of 100%, from D to A of 50%, from D to C of 100%, and from E to A of 100%.

Next, the first message state in the sequence of message states (i.e., the first E in the array 204b) may be designated as the beginning message state. Then, the transitions in the sequence of message states stored in the array 204b may be traversed forward from the beginning message state (i.e., the first E in the array 204b) until the confidence score of a transition is below the threshold confidence score 210 of 100%. For example, since the confidence score from E to A is 100%, from A to B is 100%, from B to C is 100%, from C to D is 100%, and from D to A is 50%, the first five transitions are traversed. Next, the message state (i.e., the second A in the array 204b) following the transition that is below the threshold confidence score (i.e., the transition from D to A with the confidence score of 50%) as the ending message state. Then, a candidate pattern from the beginning message state (i.e., the first E in the array 204b) to the ending message state (i.e., the second A in the array 204b) may be designated (i.e., a candidate pattern EABCDA may be designated) and stored in a matrix 212b, along with the count of the number of times the candidate pattern has appeared.

Next, the ending message state (i.e., the second A in the array 204b) may be re-designated as the beginning message state. Then, since there are still four remaining messages states that have not yet been traversed (i.e. BCDC), the traversing, the designating, and the re-designating may be repeated beginning with the beginning message state and traversing through the untraversed message states. This results in another candidate pattern ABCDC being identified and stored in the matrix 212B, which concludes the identifying of variable-length candidate patterns in the sequence of message states stored in an array 204b.

Next, the second iteration 200b may conclude with adding the candidate patterns, and the count of each pattern, that are stored in the matrix 212b to the baseline pattern store 214a of FIG. 2A, resulting in the iteratively adapted and refined baseline pattern store 214b of FIG. 2B. On the second iteration 200b of the baseline creation disclosed in FIG. 2B, since the baseline pattern store 214 already stores several patterns, this adding may include first splitting patterns and then aggregating patterns into the baseline pattern store 214. The splitting may include comparing candidate patterns stored in the matrix 212b to the patterns in the baseline pattern store 214a (of FIG. 2A, before any patterns from the second iteration 200b have been added) and splitting any of the patterns where another pattern is a prefix to the pattern. For example, since the pattern ABCD from the baseline pattern store 214a is a prefix to the pattern ABCDC in the matrix 212b, the pattern ABCDC in the matrix 212b may be split into two patterns, namely ABCD and DC, prior to adding patterns to the baseline pattern store 214b. Then, once all necessary splitting has taken place, the patterns may be aggregated into the baseline pattern store 214a and the count of each pattern in the baseline pattern store 214a may be updated, resulting in the iteratively adapted and refined baseline pattern store 214b of FIG. 2B.

As disclosed in FIG. 2C, the third iteration 200c of the baseline creation may include identifying a sequence of messages 222a-222j sent between the supervisory station 102 and the industrial device 104a over the network link 110a of FIG. 1. It is noted that the first message 222a in the sequence of messages 222a-222j in FIG. 2C is actually the last message 212j from the sequence of messages 216a-216j in FIG. 2B. It is also noted that in all three iterations of FIGS. 2A-2C, a fixed length of ten messages are identified in each sequence of messages, resulting in a linear processing time for each iteration.

Next, the third iteration 200c may include identifying a sequence of message states for the sequence of messages 222a-222j, namely CEABCDABCD. The sequence of message states may then be employed to identify variable-length candidate patterns in the sequence of message states.

In some embodiments, the act of identifying variable-length candidate patterns in the sequence of message states may include flushing and reusing the data structures 204b, 206b, 208b, and 212b of FIG. 2B and reusing these data structures as 204c, 206c, 208c, and 212c in FIG. 2C, resulting in a constant consumption of memory for each iteration. Next, the sequence of message states (i.e., CEABCDABCD) may be stored in the array 204c, the unique message states (i.e., A, B, C, D, and E) in the sequence of message states may be identified and stored in the array 206c, and transitions from each of the unique message states to each of the other unique message states stored in the array 204c may be identified and stored in the matrix 208c. Next, a count of each of the transitions stored in the array 204c may be calculated and stored in the matrix 208c.

For example, as disclosed in the matrix 208c, the sequence of message states stored in the array 204c includes two transitions from A to B, two transitions from B to C, two transitions from C to D, one transition from C to E, one transition from D to A, and one transition from E to A.

Next, a confidence score for each of the transitions may be calculated, resulting in a confidence score for the transitions from A to B of 100%, from B to C of 100%, from C to D of 67%, from C to E of 33%, from D to A of 100%, and from E to A of 100%.

Next, the first message state in the sequence of message states (i.e., the first C in the array 204c) may be designated as the beginning message state. Then, the transitions in the sequence of message states stored in the array 204c may be traversed forward from the beginning message state (i.e., the first C in the array 204c) until the confidence score of a transition is below the threshold confidence score 210 of 100%. For example, since the confidence score from C to E is 33%, only the first transition is traversed. Next, the message state (i.e., the first E in the array 204c E) following the transition that is below the threshold confidence score (i.e., the transition from C to E with the confidence score of 33%) as the ending message state. Then, a candidate pattern from the beginning message state (i.e., the first C in the array 204c) to the ending message state (i.e., the first E in the array 204c) may be designated (i.e., a candidate pattern CE may be designated) and stored in a matrix 212c, along with the count of the number of times the candidate pattern has appeared.

Next, the ending message state (i.e., the first E in the array 204c) may be re-designated as the beginning message state. Then, since there are still eight remaining messages states that have not yet been traversed (i.e. ABCDABCD), the traversing, the designating, and the re-designating may be repeated beginning with the beginning message state and traversing through the untraversed message states. This results in candidate patterns EABCD and DABCD being identified and stored in the matrix 212c, which concludes the identifying of variable-length candidate patterns in the sequence of message states stored in an array 204c.

Next, the third iteration 200c may conclude with adding the candidate patterns, and the count of each pattern, that are stored in the matrix 212c to the baseline pattern store 214b of FIG. 2B, resulting in the iteratively adapted and refined baseline pattern store 214c of FIG. 2C. This adding may include first splitting patterns and then aggregating patterns into the baseline pattern store 214c. The splitting may include comparing candidate patterns stored in the matrix 212c to the patterns in the baseline pattern store 214b (of FIG. 2B, before any patterns from the third iteration 200c have been added) and splitting any of the patterns where another pattern is a prefix to the pattern. For example, since the pattern DA from the baseline pattern store 214b is a prefix to the pattern DABCD in the matrix 212c, the pattern DABCD in the matrix 212c may be split into two patterns, namely DA and ABCD, prior to adding patterns to the baseline pattern store 214c. Then, once all necessary splitting has taken place, the patterns may be aggregated into the baseline pattern store 214b and the count of each pattern in the baseline pattern store 214b may be updated, resulting in the iteratively adapted and refined baseline pattern store 214c of FIG. 2C.

Modifications, additions, or omissions may be made to the iterations of baseline creation of FIGS. 2A-2C without departing from the scope of the present disclosure. For example, in some embodiments, one iteration, two iterations, or more than three iteration may be performed. Also, in some embodiments, in addition to keeping tracking patterns of state transitions, the time difference between state transitions, and between patterns of state transitions, may also be tracked. In these embodiments, the time difference between state transitions and/or between patterns of state transitions may be employed to identify anomalies in a real-time sequence of messages, even where the patterns of state transitions in the real-time sequence of messages are normal. Thus, along with storing state transitions and patterns of state transitions in the example data structures disclosed herein, time differences (or some variation thereof such as average time differences) between the state transitions and/or between the patterns of state transitions may also be stored.

Figure 3:
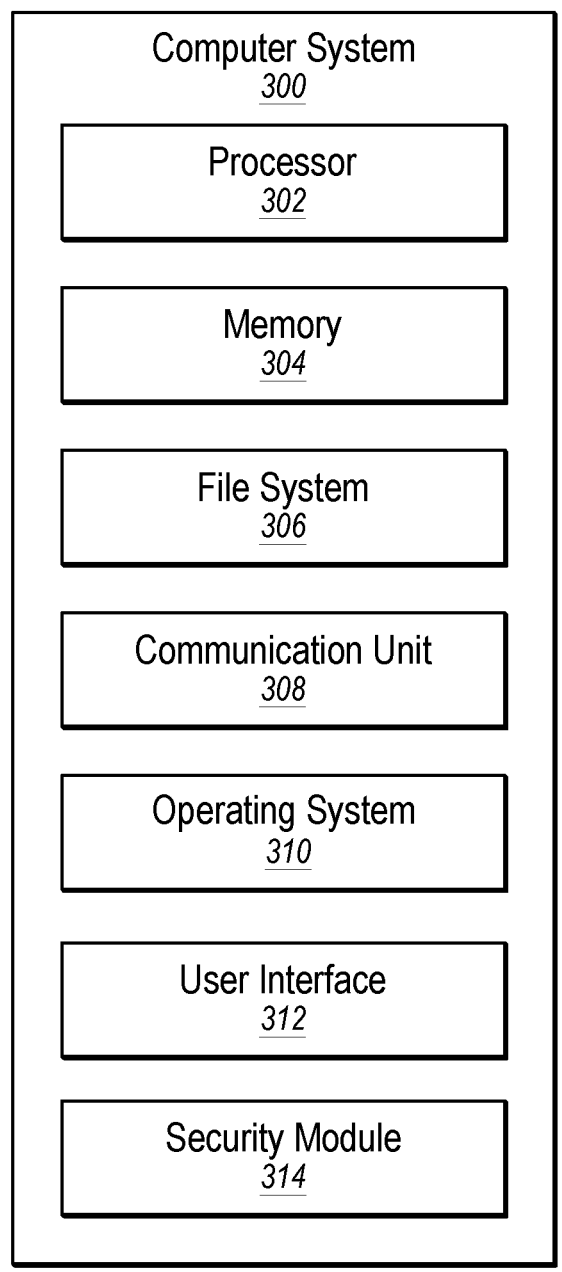
FIG. 3 illustrates an example computer system that may be employed in real-time anomaly detection in a network using state transitions.
Figure 4A:
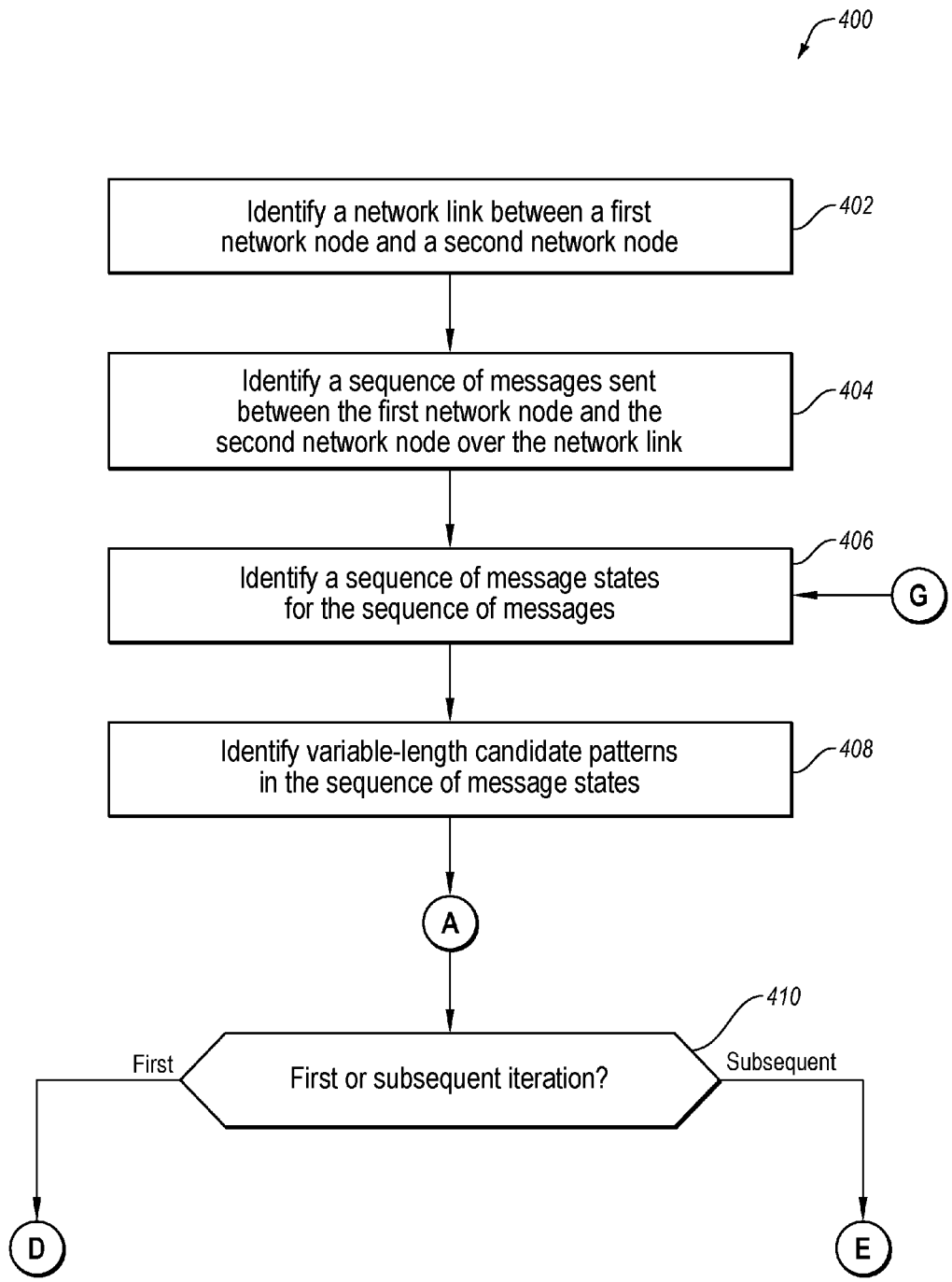
FIGS. 4A-4E are a flowchart of an example method for real-time anomaly detection in a network using state transitions.
Figure 4B:
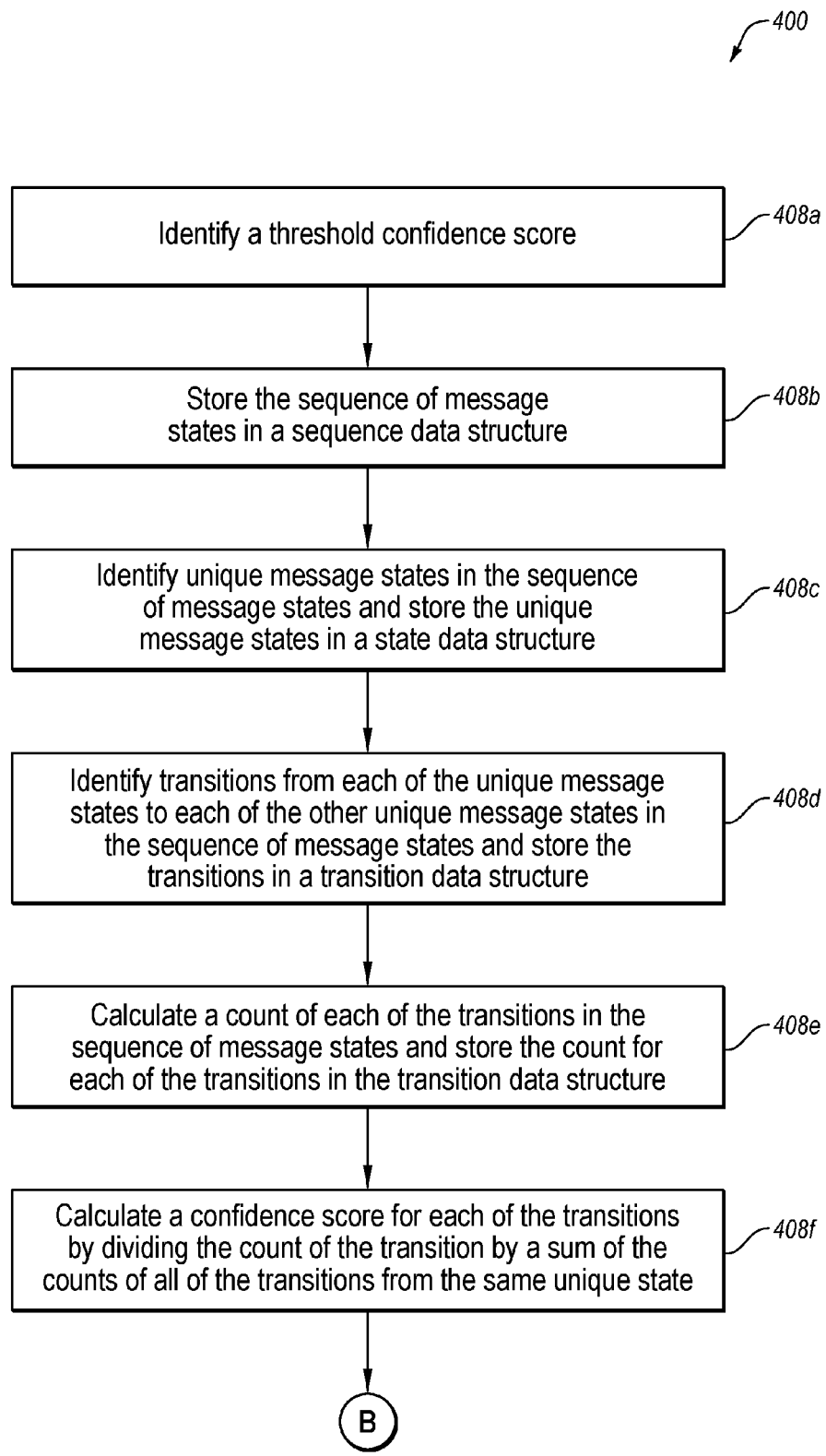
Figure 4C:
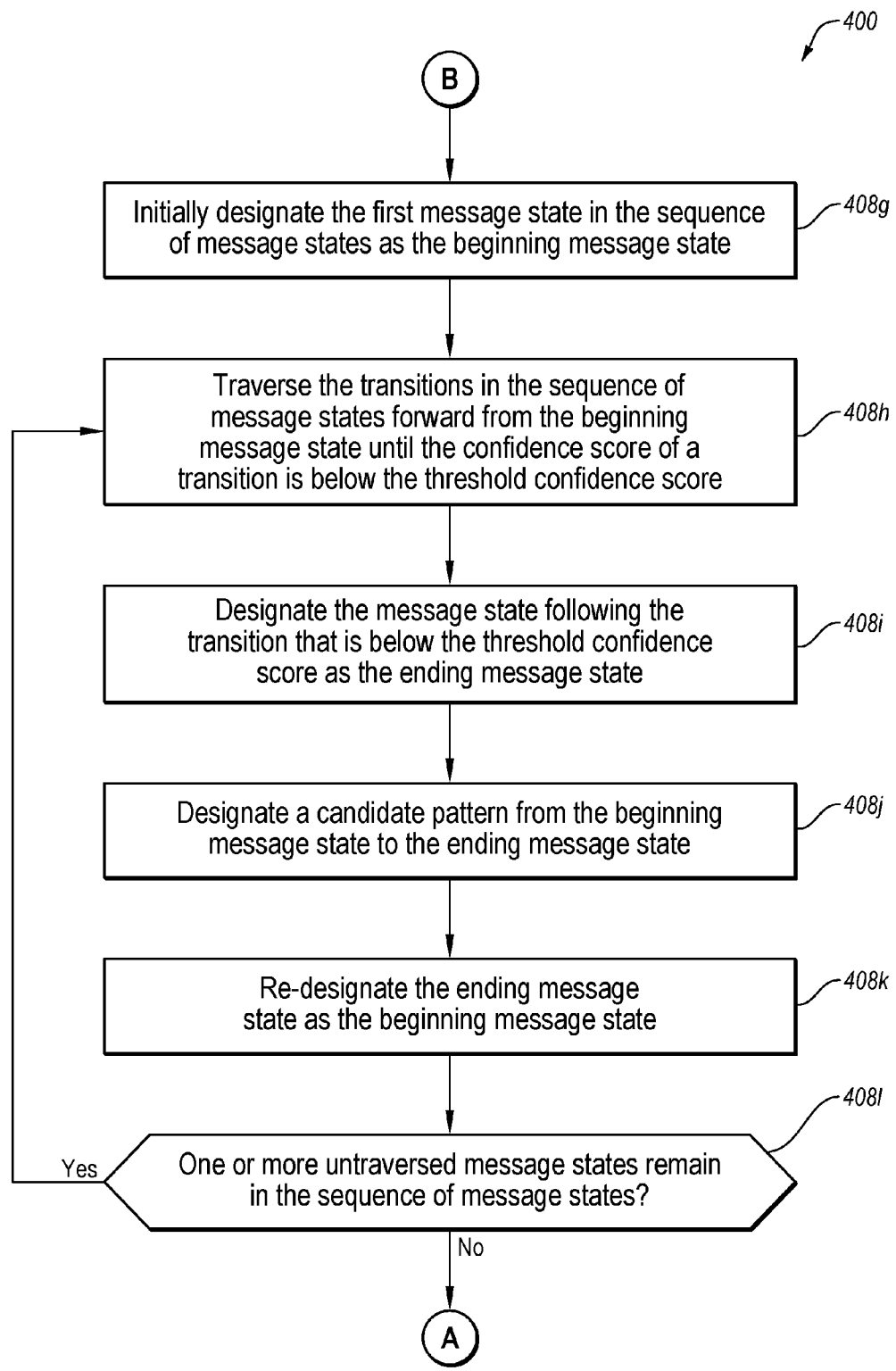
Figure 4D:
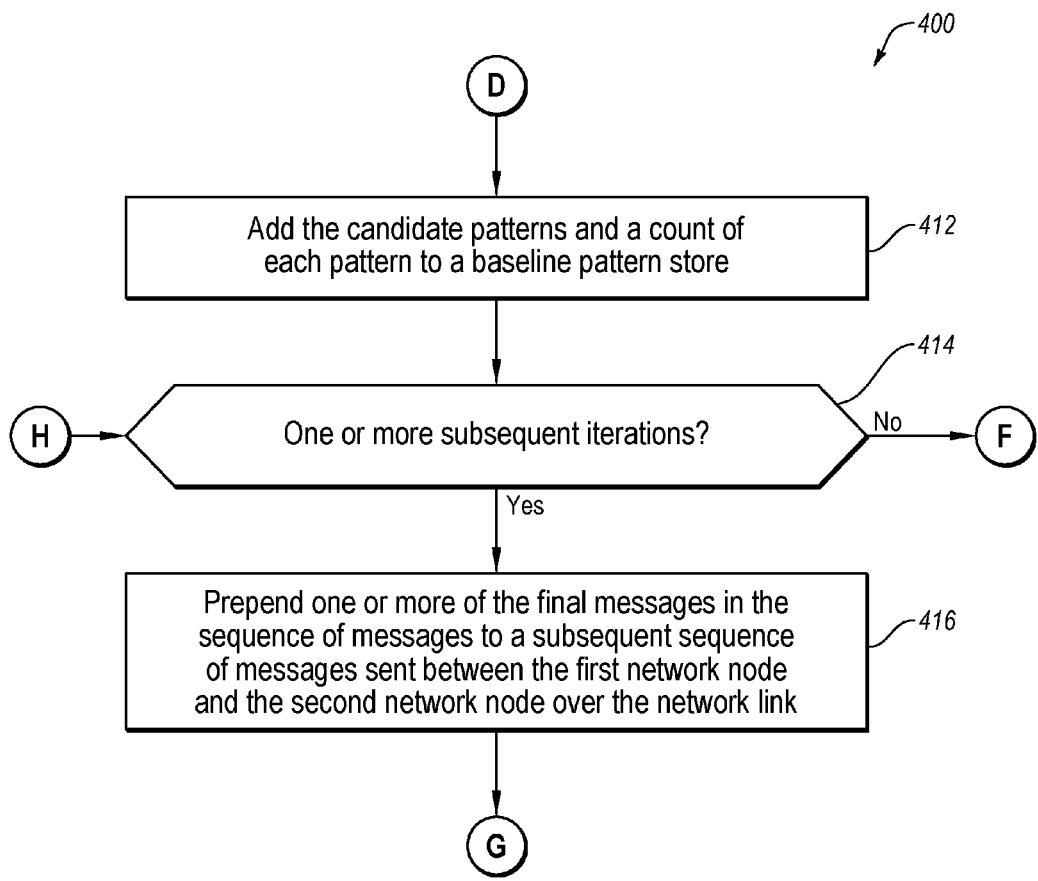
Figure 4E:
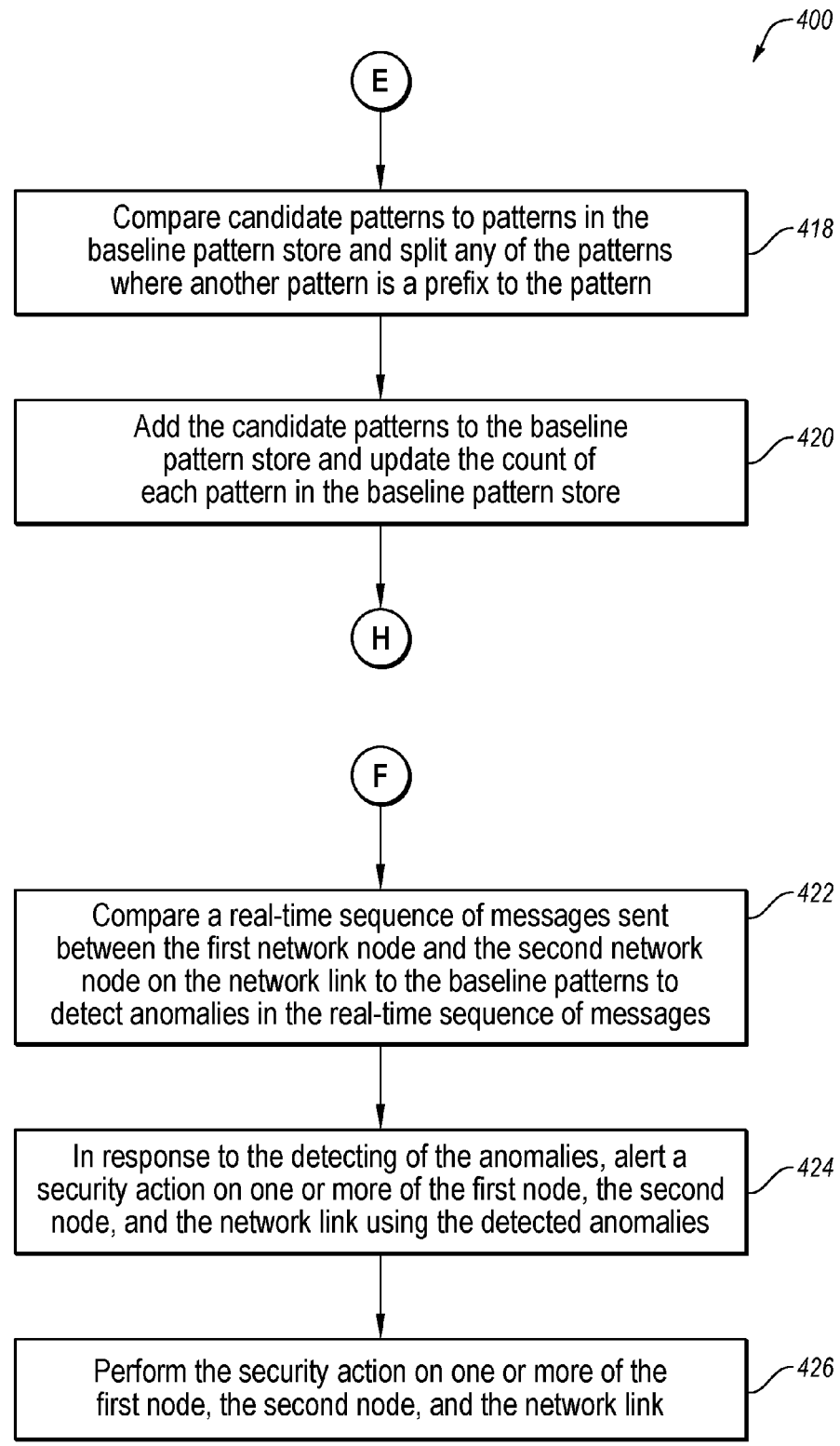

FIG. 3 illustrates an example computer system 300 that may be employed in real-time anomaly detection in a network using state transitions. In some embodiments, the computer system 300 may be part of any of the systems or devices described in this disclosure. For example, the computer system 300 may be part of any of the supervisory station 102, the industrial devices 104a-104n, or the network router 106 of FIG. 1.

The computer system 300 may include a processor 302, a memory 304, a file system 306, a communication unit 308, an operating system 310, a user interface 312, and a security module 314, which all may be communicatively coupled. In some embodiments, the computer system may be, for example, a desktop computer, a client computer, a server computer, a mobile phone, a laptop computer, a smartphone, a smartwatch, a tablet computer, a portable music player, an embedded computer, an industrial computer, an ICS asset, or any other computer system.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more blocks of the method 400 of FIGS. 4A-4E.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more blocks of the method 400 of FIGS. 4A-4E. These computer-executable instructions may be included, for example, in the operating system 310, in one or more applications, such as the security module 314, or in some combination thereof.

The communication unit 308 may include any component, device, system, or combination thereof configured to transmit or receive information over a network, such as the network 1082 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The security module 314 may be one or more computer-readable instructions stored on one or more non-transitory computer-readable media, such as the memory 304 or the file system 306, that, when executed by the processor 302, is configured to one or more methods, such as one or more of the blocks of the method 400 of FIGS. 4A-4E. In some embodiments, the security module 314 may be part of the operating system 310 or may be part of an application of the computer system 300, or may be some combination thereof. For example, the security module 314 may be part of a software application named "Symantec Anomaly Detection for Industrial Control System" which is produced by Symantec Corporation in Mountain View, Calif., USA.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

FIGS. 4A-4E are a flowchart of an example method 400 for real-time anomaly detection in a network using state transitions. The method 400 may be performed, in some embodiments, by a device or system, such as by the security module 314 of FIG. 3 executing on the supervisory station 102, on any of the industrial devices 104a-104n, or on the network router 106 of FIG. 1. In these and other embodiments, the method 400 may be performed by one or more processors based on one or more computer-readable instructions stored on one or more non-transitory computer-readable media. The method 400 will now be described in connection with FIGS. 1, 2A-2C, 3, and 4A-4E.

At block 402, a network link between a first network node and a second network node may be identified. For example, the security module 314 of FIG. 3 may identify, at block 402, the network link 110a between the supervisory station 102 (functioning as a first network node) and the industrial device 104a (functioning as a second network node).

At block 404, a sequence of messages sent between the first network node and the second network node over the network link may be identified. For example, the security module 314 of FIG. 3 may identify, at block 404, a sequence of messages 202a-202j of FIG. 2A sent between the supervisory station 102 of FIG. 1 (functioning as the first network node) and the industrial device 104a (functioning as the second network node) over the network link 110a.

At block 406, a sequence of message states for the sequence of messages may be identified. For example, the security module 314 of FIG. 3 may identify, at block 406, a sequence of message states (i.e., ABCDABCDCE) for the sequence of messages 202a-202j of FIG. 2A.

At block 408, variable-length candidate patterns in the sequence of message states may be identified. For example, the security module 314 of FIG. 3 may identify, at block 408, the variable-length candidate patterns ABCD, DA, DC, and CE as stored in the matrix 212a of FIG. 2A in the sequence of message states (i.e., ABCDABCDCE). In some embodiments, block 408 may include one or more of blocks 408a-408l of FIGS. 4B-4C.

At block 408a, a threshold confidence score may be identified. For example, the security module 314 of FIG. 3 may identify, at block 408a, the threshold confidence score 210 of 100% of FIG. 2A.

At block 408b, the sequence of message states may be stored in a sequence data structure. For example, the security module 314 of FIG. 3 may store, at block 408b, the sequence of message states (i.e., ABCDABCDCE) in the array 204a of FIG. 2A.

At block 408c, unique message states in the sequence of message states may be identified and the unique message states may be stored in a state data structure. For example, the security module 314 of FIG. 3 may identify, at block 408c, the unique message states A, B, C, D, and E in the array 204a of FIG. 2A and may store the unique messages states in the array 206a.

At block 408d, transitions from each of the unique message states to each of the other unique message states in the sequence of message states may be identified and the transitions may be stored in a transition data structure. For example, the security module 314 of FIG. 3 may identify, at block 408d, transitions from each of the unique message states to each of the other unique message states stored in the array 204a of FIG. 2A, and these transitions may then be stored in the matrix 208a.

At block 408e, a count of each of the transitions in the sequence of message states may be calculated and the count for each of the transitions may be stored in the transition data structure. For example, the security module 314 of FIG. 3 may calculate, at block 408e, a count from the array 204a of FIG. 2A of two transitions from A to B in FIG. 2A, two transitions from B to C, two transitions from C to D, one transition from C to E, one transition from D to A, and one transition from D to C, and these counts may then be stored in the matrix 208a.

At block 408f, a confidence score for each of the transitions may be calculated by dividing the count of the transition by a sum of the counts of all of the transitions from the same unique state. For example, the security module 314 of FIG. 3 may calculate, at block 408f, a confidence score, based on the matrix 208a of FIG. 2A, for the transition from A to B of 100%, from B to C of 100%, from C to D of 67%, from C to E of 33%, from D to A of 50%, and from D to C of 50%.

At block 408g, the first message state in the sequence of message states may be designated as the beginning message state. For example, the security module 314 of FIG. 3 may designate, at block 408g, the first message state (i.e., the first A in the array 204a of FIG. 2A) as the beginning message state.

At block 408h, the transitions in the sequence of message states may be traversed forward from the beginning message state until the confidence score of a transition is below the threshold confidence score. For example, the security module 314 of FIG. 3 may traverse, at block 408h, the transitions in the sequence of message states in the array 204a of FIG. 2A forward from the beginning message state (i.e., the first A in the array 204a) until the confidence score of a transition is below the threshold confidence score 210 of 100%. In this example, since the confidence score from A to B is 100%, from B to C is 100%, and from C to D is 67%, the first three transitions are traversed.

At block 408i, the message state following the transition that is below the threshold confidence score may be designated as the ending message state. For example, the security module 314 of FIG. 3 may designate, at block 408i, the message state (i.e., the first D in the array 204a of FIG. 2A) following the transition that is below the threshold confidence score (i.e., the first transition from C to D with the confidence score of 67%) may be designated as the ending message state.

At block 408j, a candidate pattern from the beginning message state to the ending message state may be designated. For example, the security module 314 of FIG. 3 may designate, at block 408j, a candidate pattern (i.e., the candidate pattern ABCD in the matrix 212a of FIG. 2A) from the beginning message state (i.e., the first A in the array 204a) to the ending message state (i.e., the first D in the array 204a).

At block 408k, the ending message state may be re-designated as the beginning message state. For example, the security module 314 of FIG. 3 may re-designate, at block 408k, the ending message state (i.e., the first D in the array 204a of FIG. 2A) as the beginning message state.

At decision block 408l, it may be determined whether one or more untraversed message states remain in the sequence of message states. If so (Yes at decision block 408l), the method 400 may return to the block 408h. If not (No at decision block 408l), the method 400 may continue with the decision block 410. For example, the security module 314 of FIG. 3 may determine, at decision block 408l, that there are six remaining messages states that have not yet been traversed (i.e. ABCDCE in the array 204a of FIG. 2A) (Yes at decision block 408l), and therefore the security module 314 may repeat blocks 408h-408l beginning with the beginning message state (i.e., the first D in the array 204a) that was designated at block 408k. In this example, blocks 408h-408l will be performed a total of five times, resulting in two patterns ABCD, and one pattern each of DA, DC, and CD, and these five patterns may be stored in the matrix 212a.

At decision block 410, it may be determined whether this is a first or subsequent iteration. If this is the first iteration (First at decision block 410), the method 400 may continue with block 412. However, if this is a subsequent iteration (Subsequent at decision block 410), the method 400 may continue with a block 418. For example, the security module 314 of FIG. 3 may determine, at decision block 410, that this is the first iteration 200a of FIG. 2A (First at decision block 410), and the security module 314 may therefore continue on to block 412.

At block 412, the candidate patterns and a count of each pattern may be added to a baseline pattern store. For example, the security module 314 of FIG. 3 may add, at block 412, the candidate patterns, a count of each pattern, from the matrix 212a of FIG. 2A to the baseline pattern store 214a.

At decision block 414, it may be determined whether there are one or more subsequent iterations. If so (Yes at decision block 414), the method 400 may continue with block 416. However, if not (No at decision block 414), the method 400 may continue with block 422. For example, the security module 314 of FIG. 3 may determine, at decision block 414, that there are two subsequent iterations, namely the second iteration 200b of FIG. 2B and the third iteration 200c of FIG. 2C (Yes at decision block 414), and the security module 314 may therefore continue on to block 416.

At block 416, one or more of the final messages in the sequence of messages may be prepended to a subsequent sequence of messages sent between the first network node and the second network node over the network link, and the method 400 may then return to block 406. For example, the security module 314 of FIG. 3 may prepend, at block 416, the last message 202j from the sequence of messages 202a-202j of FIG. 2A to the sequence of messages 216a-216j of FIG. 2B as the first message 216a. In this example, the security module 314 may then return to block 406 and repeat block 408 (including blocks 408a-408l) for the sequence of messages 216a-216j in FIG. 2B, resulting in the candidate patterns illustrated in the matrix 212b. In this example, the security module 314 of FIG. 3 would then determine, at decision block 410, that the second iteration 200b of FIG. 2 is a subsequent iteration and continue to block 418.

At block 418, the candidate patterns may be compared to patterns in the baseline pattern store and any of the patterns where another pattern is a prefix to the pattern may be split. For example, the security module 314 of FIG. 3 may compare, at block 418, the candidate patterns from the matrix 212b of FIG. 2B to the patterns in the baseline pattern store 214a of FIG. 2A. Then, since the pattern ABCD from the baseline pattern store 214a is a prefix to the pattern ABCDC in the matrix 212b, the security module 314 of FIG. 3 may split the pattern ABCDC in the matrix 212b into two patterns, namely ABCD and DC.

At block 420, the candidate patterns may be added to the baseline pattern store and the count of each pattern may be updated in the baseline pattern store, and then the method 400 may return to decision block 414. For example, the security module 314 of FIG. 3 may add, at block 420, the candidate patterns from the matrix 212b of FIG. 2B, as split at block 418, to the baseline pattern store 214a of FIG. 2A, and the count of each pattern in the baseline pattern store 214a may be updated, resulting in the iteratively adapted and refined baseline pattern store 214b of FIG. 2B. In this example, the security module 314 of FIG. 3 may then return to the decision block 414, then to the block 416, then to the blocks 406 and block 408 (including blocks 408a-408l) for the sequence of messages 222a-222j in FIG. 2C, then on to block 418 and 420, resulting in the iteratively adapted and refined baseline pattern store 214c of FIG. 2C. The security module 314 of FIG. 3 may then return to the decision block 414, and since there are no more iterations (No at decision block 414), the security module 314 may continue to block 422.

At block 422, a real-time sequence of messages sent between the first network node and the second network node on the network link may be compared to the baseline patterns to detect anomalies in the real-time sequence of messages. For example, the security module 314 of FIG. 3 may compare, at block 422, a real-time sequence of messages to the baseline patterns stored in the baseline patterns store 214c of FIG. 2C to detect anomalies in the real-time sequence of messages. In this example, the real-time sequence of messages may be sent between the supervisory station 102 of FIG. 1 (functioning as the first network node) and the industrial device 104a (functioning as the second network node) on the network link 110a.

At block 424, in response to the detecting of the anomalies at block 422, a security action may be alerted on one or more of the first node, the second node, and the network link using the detected anomalies. For example, in response to the detecting of the anomalies at block 422, the security module 314 of FIG. 3 may alert, at block 424, a security action, using the detected anomalies, on one or more of the supervisory station 102 (functioning as the first network node), the industrial device 104a (functioning as the second network node), and the network link 110a. In some embodiments, the detected anomaly may be a malicious attack on, or a malfunctioning component in, the system 100, and the alert include a suggested security action to prevent the malicious attack or the malfunctioning component from causing damage or harm to the system 100. In some embodiments, the alert may be reported to an interested party, such as an ICS technician, a security-service provider, etc.

At block 426, the security action may be performed on one or more of the first node, the second node, and the network link. For example, the security module 314 of FIG. 3 may perform, at block 426, the security action on one or more of the supervisory station 102 (functioning as the first network node), the industrial device 104a (functioning as the second network node), and the network link 110a.

In some embodiments, the method 400 may be accomplished with higher accuracy, lower complexity, lower memory requirements, and lower computational requirements than conventional anomaly detection, resulting in anomaly detection in real-time and at line speeds.

Although the blocks of the method 400 are illustrated in FIGS. 4A-4E as discrete blocks, various blocks may be divided into additional blocks, combined into fewer blocks, reordered, expanded, or eliminated, depending on the desired implementation. For example, in some embodiments, blocks 402-420 may be performed without performing blocks 422-426. Also, in some embodiments, block 426 may be eliminated or may be performed by a user or other entity that is different from the entity performing the other blocks of the method 400. Further, in some embodiments, blocks 402-420 may be repeated in parallel with the repeating of one or more of blocks 422-426.

Further, it is understood that the method 400 may improve the functioning of an ICS agent in an ICS environment. For example, the functioning of the supervisory station 102, any of the industrial devices 104a-104n, or the network router 106 of FIG. 1 may itself be improved by the method 400. For example, any of these ICS agents may be improved by creating a baseline pattern store with higher accuracy, lower complexity, lower memory requirements, and lower computational requirements than conventional anomaly detection, resulting in anomaly detection in real-time and at line speeds. Further, unlike conventional anomaly detection that only detects fixed-length patterns, the method 400 may improve the functioning of an ICS agent by detecting variable-length candidate patterns. Also, unlike conventional anomaly detection that only detects candidate patterns within a single sequence, the method 400 may improve the functioning of an ICS agent by detecting candidate patterns across multiple sequences and across sequence boundaries.

Also, the method 400 may improve the technical field of anomaly detection in network messages at least because modeling of baseline patterns in conventional anomaly detection is too slow to detect anomalies in real-time and at line speeds, and suffers from low accuracy, high complexity, high memory requirements, and high computational requirements. In contrast, the method 400 is able to model baseline patterns with higher accuracy, lower complexity, lower memory requirements, and lower computational requirements than conventional anomaly detection, resulting in the ability to detect anomalies in real-time and at line speeds.

As indicated above, the embodiments described herein may include the use of a special purpose or general purpose computer (e.g., the processor 302 of FIG. 3) including various computer hardware or software modules, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for real-time anomaly detection in a network using state transitions, at least a portion of the method being performed by a computing device comprising at least one processor, the method comprising:

(a) identifying a network link between a first network node and a second network node;
(b) identifying a sequence of messages sent between the first network node and the second network node over the network link, with each message having a message state;
(c) identifying a sequence of message states for the sequence of messages;
(d) identifying variable-length candidate patterns in the sequence of message states, each variable-length candidate pattern identified by storing the sequence of message states in a sequence data structure, identifying unique message states in the sequence of message states and storing the unique message states in a state data structure, identifying transitions from each of the unique message states to each of the other unique message states in the sequence of message states and storing the transitions in a transition data structure, calculating confidence scores for the transitions, and traversing the transitions until the confidence score of a transition is below a threshold confidence score, with the variable-length candidate pattern being designated as the message states from just prior to the first traversed transition to just after the transition with the confidence score that is below the threshold confidence score;
(e) adding the variable-length candidate patterns, and a count of each of the variable-length candidate patterns, to a baseline pattern store;
(f) comparing a real-time sequence of messages sent between the first network node and the second network node on the network link to the patterns in the baseline pattern store to detect anomalies in the real-time sequence of messages; and
(g) in response to the detecting of the anomalies, alerting a security action on one or more of the first network node, the second network node, and the network link using the detected anomalies.

2. The method of claim 1, wherein (a)-(g) are performed by a network device that is configured to intercept, or passively listen to, in real-time, sequences of messages sent between the first network node and the second network node on the network link.

3. The method of claim 1, wherein (a)-(g) are performed by the first network node or by the second network node.

4. The method of claim 1, wherein:
the first network node comprises a supervisory station of an industrial control system; and
the second network node comprises an industrial device of the industrial control system.

5. The method of claim 1, wherein the messages in the sequence of messages are formatted in one or more of a MODBUS protocol, a Common Industrial Protocol (CIP) protocol, and a Distributed Network Protocol 3 (DNP3) protocol.

6. The method of claim 1, further comprising:
(h) performing the security action on one or more of the first network node, the second network node, and the network link.

7. A computer-implemented method for real-time anomaly detection in a network using state transitions, at least a portion of the method being performed by a computing device comprising at least one processor, the method comprising:
(a) identifying a network link between a first network node and a second network node;
(b) identifying a sequence of messages sent between the first network node and the second network node over the network link, with each message having a message state;
(c) identifying a sequence of message states for the sequence of messages;
(d) identifying variable-length candidate patterns in the sequence of message states, each variable-length candidate pattern identified by storing the sequence of message states in a sequence data structure, identifying unique message states in the sequence of message states and storing the unique message states in a state data structure, identifying transitions from each of the unique message states to each of the other unique message states in the sequence of message states and storing the transitions in a transition data structure, calculating confidence scores for the transitions, and traversing the transitions until the confidence score of a transition is below a threshold confidence score, with the variable-length candidate pattern being designated as the message states from just prior to the first traversed transition to just after the transition with the confidence score that is below the threshold confidence score;
(e) adding the variable-length candidate patterns and a count of each of the variable-length candidate patterns to a baseline pattern store;
(f) for one or more additional iterations:
 (f.1) prepending one or more of the final messages in the sequence of messages to a subsequent sequence of messages sent between the first network node and the second network node over the network link and repeating (c)-(d) on the subsequent sequence of messages;
 (f.2) comparing candidate patterns to patterns in the baseline pattern store and splitting any of the patterns where another pattern is a prefix to the pattern; and
 (f.3) adding the candidate patterns to the baseline pattern store and updating the count of each pattern in the baseline pattern store;
(g) comparing a real-time sequence of messages sent between the first network node and the second network node on the network link to the patterns in the baseline pattern store to detect anomalies in the real-time sequence of messages; and
(h) in response to the detecting of the anomalies, alerting a security action on one or more of the first network node, the second network node, and the network link using the detected anomalies.

8. The method of claim 7, wherein (a)-(h) are performed by a network device that is configured to intercept, or passively listen to, in real-time, sequences of messages sent between the first network node and the second network node on the network link.

9. The method of claim 7, wherein (a)-(h) are performed by the first network node or by the second network node.

10. The method of claim 7, wherein:
the first network node comprises a supervisory station of an industrial control system; and
the second network node comprises an industrial device of the industrial control system.

11. The method of claim 7, wherein the messages in the sequence of messages are formatted in one or more of a MODBUS protocol, a Common Industrial Protocol (CIP) protocol, and a Distributed Network Protocol 3 (DNP3) protocol.

12. The method of claim 7, further comprising:
(i) performing the security action on one or more of the first network node, the second network node, and the network link.

13. The method of claim 7, further comprising:
(i) periodically repeating (b)-(f) in parallel to repeating (g)-(h).

14. One or more non-transitory computer-readable media comprising one or more computer-readable instructions that, when executed by one or more processors of one or more computing devices, cause the one or more computing devices to:
(a) identify a network link between a first network node and a second network node;
(b) identify a sequence of messages sent between the first network node and the second network node over the network link, with each message having a message state;
(c) identify a sequence of message states for the sequence of messages;
(d) identify variable-length candidate patterns in the sequence of message states, each variable-length candidate pattern identified by storing the sequence of message states in a sequence data structure, identifying unique message states in the sequence of message states and storing the unique message states in a state data structure, identifying transitions from each of the unique message states to each of the other unique message states in the sequence of message states and storing the transitions in a transition data structure, calculating confidence scores for the transitions, and traversing the transitions until the confidence score of a transition is below a threshold confidence score, with the variable-length candidate pattern being designated as the message states from just prior to the first traversed transition to just after the transition with the confidence score that is below the threshold confidence score;
(e) add the variable-length candidate patterns and a count of each of the variable-length candidate patterns to a baseline pattern store
(f) for one or more additional iterations:
(f.1) prepend one or more of the final messages in the sequence of messages to a subsequent sequence of messages sent between the first network node and the second network node over the network link and repeat (c)-(d) on the subsequent sequence of messages;
(f.2) compare candidate patterns to patterns in the baseline pattern store and split any of the patterns where another pattern is a prefix to the pattern; and
(f.3) add the candidate patterns to the baseline pattern store and update the count of each pattern in the baseline pattern store;
(g) compare a real-time sequence of messages sent between the first network node and the second network node on the network link to the patterns in the baseline pattern store to detect anomalies in the real-time sequence of messages; and
(h) in response to the detecting of the anomalies, alert a security action on one or more of the first network node, the second network node, and the network link using the detected anomalies.

15. The one or more non-transitory computer-readable media of claim 14, wherein:
the one or more computing devices comprise a network device that is configured to intercept, or passively listen to, in real-time, sequences of messages sent between the first network node and the second network node on the network link;
the first network node comprises a supervisory station of an industrial control system;
the second network node comprises an industrial device of the industrial control system; and
the messages in the sequence of messages are formatted in one or more of a MODBUS protocol, a Common Industrial Protocol (CIP) protocol, and a Distributed Network Protocol 3 (DNP3) protocol.

16. The one or more non-transitory computer-readable media of claim 14, wherein the one or more computer-readable instructions, when executed by one or more processors of one or more computing devices, further cause the one or more computing devices to:
(i) perform the security action on one or more of the first network node, the second network node, and the network link.

17. The one or more non-transitory computer-readable media of claim 14, wherein the one or more computer-readable instructions, when executed by one or more processors of one or more computing devices, further cause the one or more computing devices to:
(i) periodically repeat (b)-(f) in parallel to repeating (g)-(h).

* * * * *